United States Patent [19]

George, II

[11] Patent Number: 5,404,739
[45] Date of Patent: Apr. 11, 1995

[54] PORTABLE LOUVER-FORMING TOOL

[75] Inventor: David L. George, II, 1021 Broadrun Rd., West Chester, Pa. 19380

[73] Assignee: David L. George, II, Cochranville, Pa.

[21] Appl. No.: 30,832

[22] Filed: Mar. 12, 1993

[51] Int. Cl.6 .............. B21B 1/00; B21D 43/28; B23D 19/02
[52] U.S. Cl. .................. 72/204; 72/220; 72/294; 83/477; 83/485; 83/508
[58] Field of Search ........... 72/199, 204, 210, 214, 72/220, 294, 316, 332; 83/453, 455, 477, 485, 508, 508.2, 662, 781

[56] References Cited

U.S. PATENT DOCUMENTS

| | | | |
|---|---|---|---|
| 407,530 | 7/1889 | Irwin | 72/220 |
| 696,816 | 4/1902 | Herden | 72/204 |
| 1,158,794 | 11/1915 | Drumm | 72/214 |
| 1,894,010 | 1/1933 | Tautz | 83/453 |
| 2,696,182 | 12/1954 | Hoenninger et al. | 72/214 |
| 3,217,628 | 11/1965 | Sweeney et al. | |
| 3,773,455 | 11/1973 | Warp | |
| 3,890,870 | 6/1975 | Van Cleave | |
| 4,034,453 | 7/1977 | Tomita et al. | |
| 4,188,754 | 2/1980 | Yamamoto | 83/455 |
| 4,305,271 | 12/1981 | Whatley | 72/220 |
| 5,243,890 | 9/1993 | Ober | 83/508 |

Primary Examiner—Lowell A. Larson
Assistant Examiner—Thomas C. Schoeffler
Attorney, Agent, or Firm—Ratner & Prestia

[57] ABSTRACT

A portable tool for forming louvers in a sheet metal work piece. The tool has a substantially C-shaped frame with an upper leg, a lower leg, and a body forming a throat in which the louvers are formed. A female die assembly is mounted on the lower leg of the frame. A male die is positioned in a carriage which slides longitudinally along the upper leg of the frame. Stops define the length of travel of the carriage and clamps hold the work piece between the female die assembly and the male die. An increasing cutting and forming force is applied to the male die, and against the work piece and the female die assembly, until a louver is cut and formed in the work piece.

35 Claims, 13 Drawing Sheets

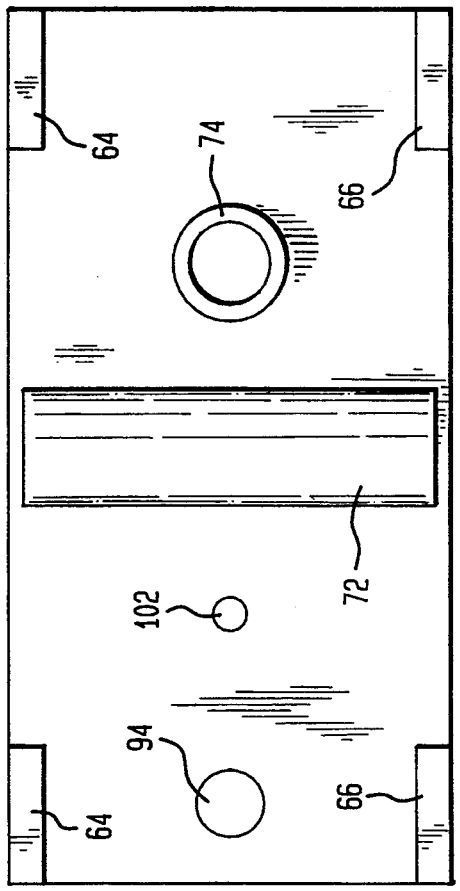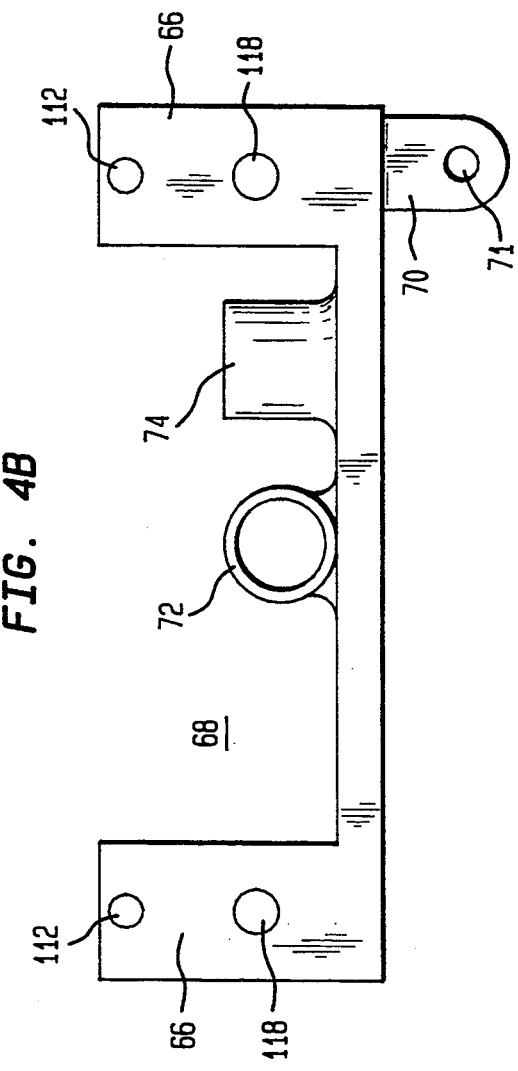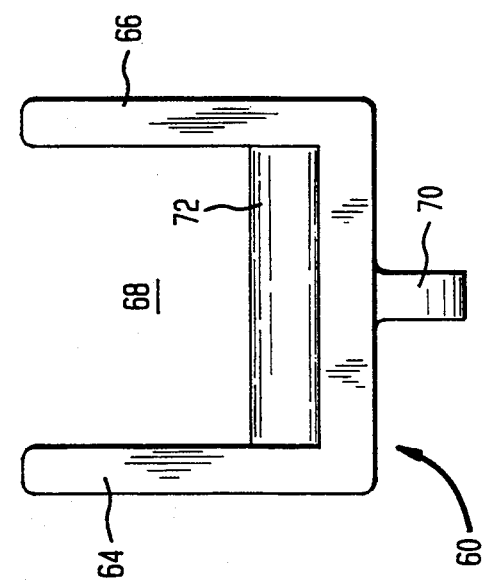

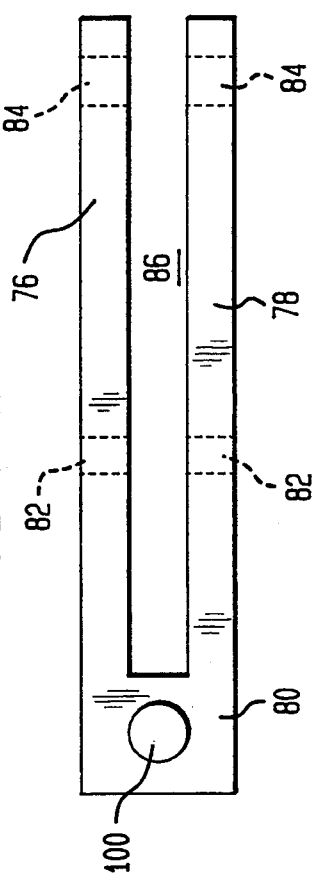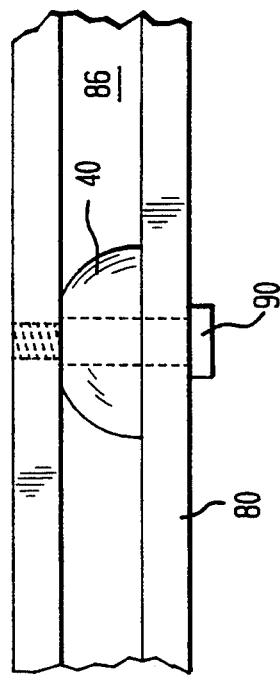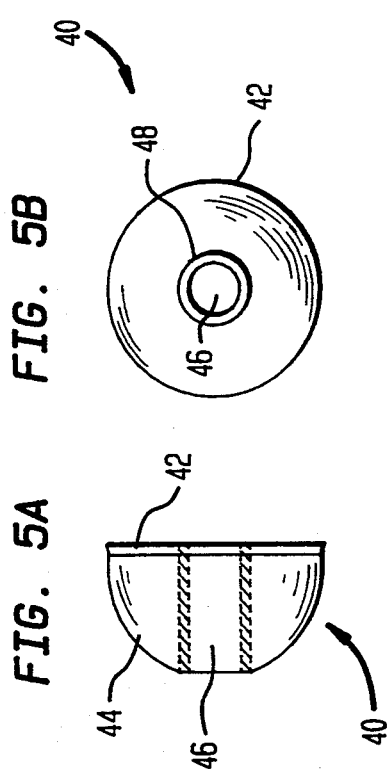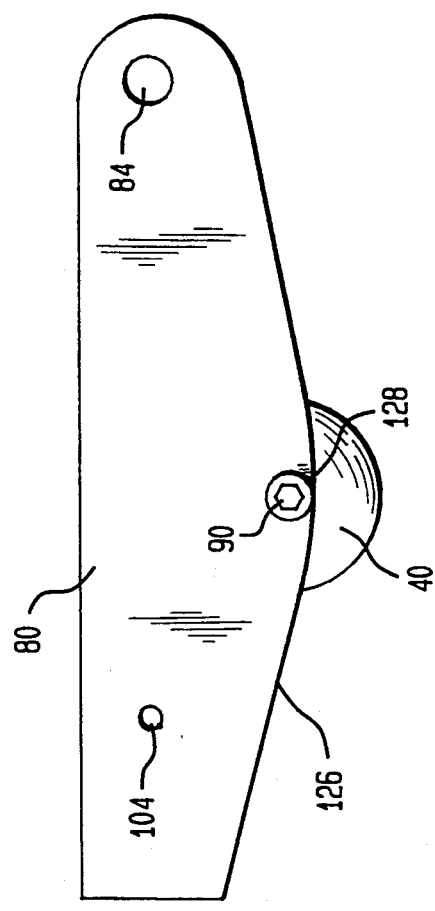

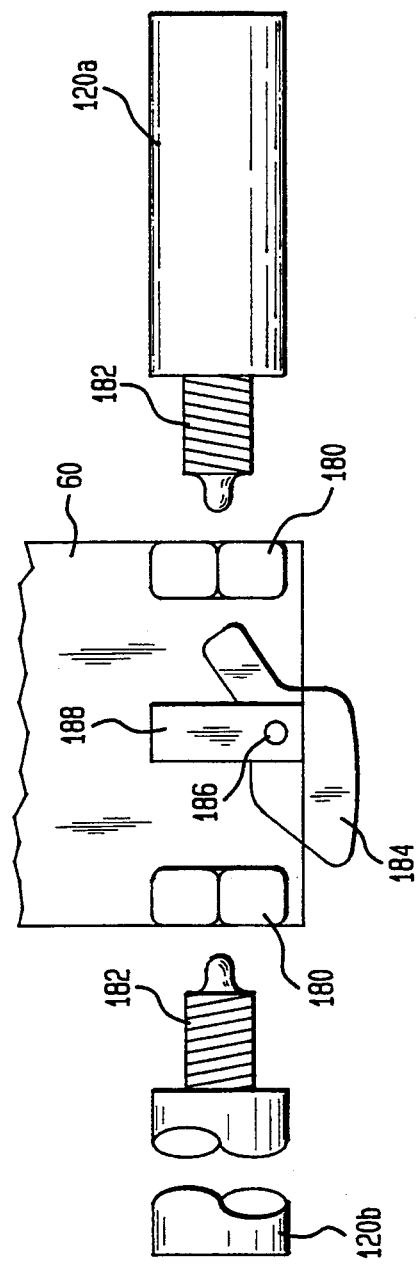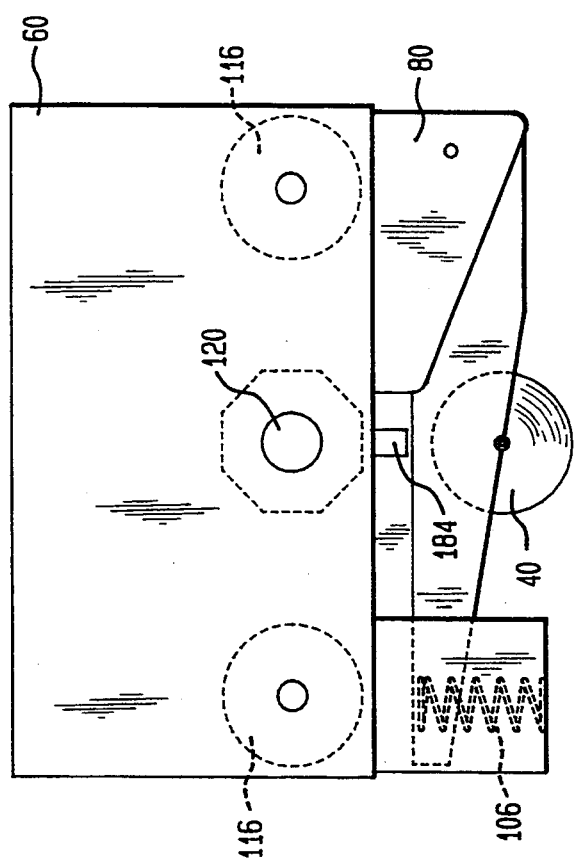

PORTABLE LOUVER-FORMING TOOL

FIELD OF THE INVENTION

This invention relates generally to a tool used to form louvers in sheet metal or the like and, more particularly, to an improved, portable tool for slicing and forming louvers in sheet metal.

BACKGROUND OF THE INVENTION

Louvers are openings in structures with slanting or sloping slats. They are commonly formed in parallel to create a grille member used to aesthetically conceal and protect an internal structure, excluding weather elements such as sun and rain while allowing ventilation. Typically, louvers are formed in sheet metal panels. The panels find application in the automotive, industrial, and electrical fields.

Machines for forming louvers are well known, as exemplified by U.S. Pat. No. 3,890,870 issued to Van Cleave on Jun. 24, 1975. The Van Cleave patent discloses a basic louver punch including a frame, a punch and die arrangement, and an actuating mechanism. The punch is forced through the sheet metal by reciprocating the punch vertically. One disadvantage of the punch-type mechanism is the risk of binding. Another disadvantage is the excess force necessary to operate the cutter to punch through the sheet metal. Such force requires machinery or at least a lever to assist the operator.

Another problem arises in prior art devices which include an indexing feature to permit louvers to be formed in series or in both longitudinal and transverse directions. Such indexing features fail to properly align the punch and die, which may cause the louver to be formed in an incorrect position.

Still another problem with prior art devices is the rapid wear on the working edge of the anvil. The anvil is subjected to repeated shearing stress each time the cutting member punches through the sheet metal against the anvil. After a certain number of punching operations, the working edge of the anvil wears out and the anvil must either be sharpened or replaced.

Known louver-forming machines are relatively large, heavy, and expensive devices designed to repeatedly form a louver of a specified length, width, and depth in a particular structural part. They are neither portable nor, in general, adjustable. In addition, the known machines tend to score, mar, or distort the sheet metal into which the louvers are formed.

To overcome the shortcomings of the known louver-forming machines, a news portables louver-forming tool is provided. An object of the present invention is to provide a tool which is light enough to be transported for, but is not restricted to, use on site on existing automobiles, covers, or panels requiring louvers. A related object is to provide a tool which can be easily mounted in a standard bench vice, on a standard motor stand, or to a stand constructed specifically for its use. Such versatility facilitates use of the tool both when the sheet metal can be brought to the tool and when the sheet metal cannot be moved easily.

Another object is to provide a tool which can slice and form louvers of adjustable length, width, depth, and final shape into sheet metal. A related object is to provide a tool which can form louvers in three-dimensional (non-flat) sheet metal having lips, creases, folds, and curves common to automotive, industrial, and electrical panels.

It is still another object of the present invention to provide a tool which is sufficiently simple in operation and inexpensive to be useful and available to the average layperson interested in forming louvers. An additional object is to provide a tool which, when forming a louver, minimizes scores, mars, and distortion of the sheet metal in which the louvers are formed. Yet another object of this invention is to reduce the number of work cycles of the tool necessary to slice and form the desired louver.

SUMMARY OF THE INVENTION

To achieve these and other objects, and in view of its purposes, the present invention provides a portable tool for forming louvers in a sheet metal work piece. The tool has a substantially C-shaped frame with an upper leg, a lower legs and a body forming a throat in which the louvers are formed. A female die assembly is mounted on the lower leg of the frame. A male die is positioned in a carriage which slides longitudinally along the upper leg of the frame. Stops define the length of travel of the carriage and clamps hold the work piece between the female die assembly and the male die. An increasing cutting and forming force is applied to the male die, and against the work piece and the female die assembly, until a louver is cut and formed in the work piece.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing, in which:

FIGS. 4A (top view), 4B (side view), and 4C (front view) show the carriage of the present invention;

FIG. 5A is a front view and FIG. 5B is a side view of the male die of the present invention;

FIGS. 6A, 6B, and 6C illustrate the lever of the present invention;

FIGS. 15A and 15B illustrate an alternative embodiment of the carriage of the present invention for generating the cutting and forming force exerted on the work piece;

DETAILED DESCRIPTION OF THE INVENTION

Figure 1:
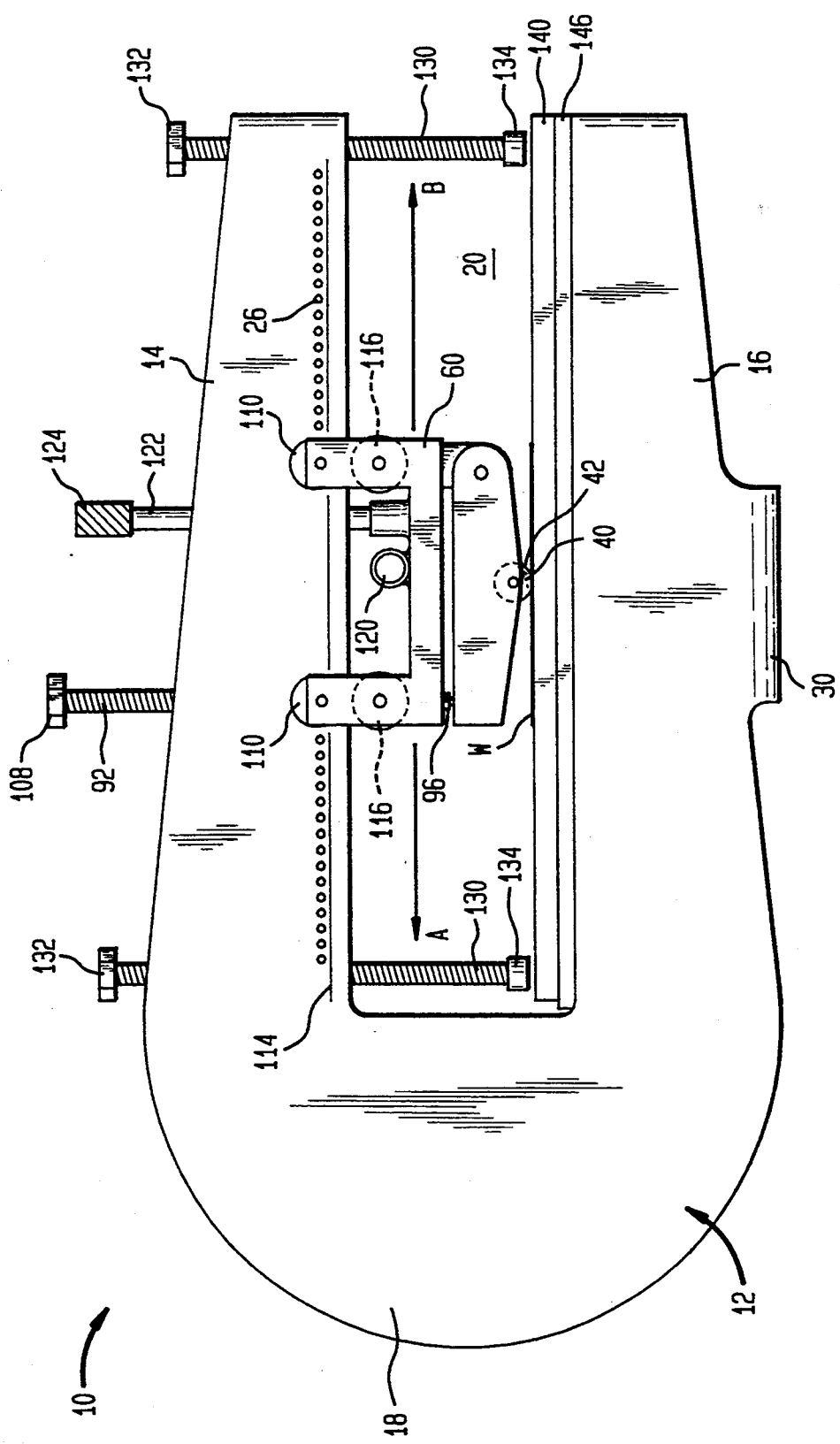
FIG. 1 is a side view of a first embodiment of the portable louver-forming tool according to the present invention.

Referring now to the drawing, wherein like reference numerals refer to like elements throughout, FIG. 1 shows a first embodiment of the portable louver-forming tool 10. Tool 10 has a generally C-shaped frame 12 having an upper leg 14, a lower leg 16, and a body 18. Upper leg 14, lower leg 16, and body 18 form a throat 20 in which louvers are formed in sheet metal work piece W. A male die 40 is held rotatably in a carriage 60 so that the cutting edge 42 of male die 40 contacts work piece W. Carriage 60 slides along upper leg 14 on rollers in the directions of arrow A (to the left) and arrow B (to the right) along the longitudinal axis C (see FIG. 2B) of frame 12. A female die assembly 140 is fixed on lower leg 16 of frame 12 and supports work piece W.

Figure 2A:
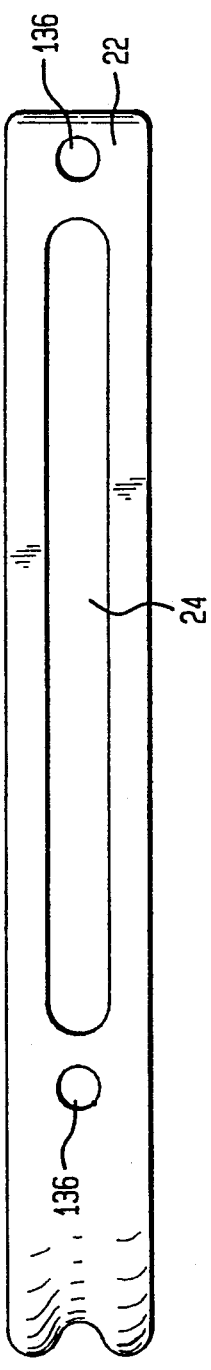
FIG. 2A is a top view of a standard frame according to the present invention and FIG. 2B and FIG. 2C are side and bottom views, respectively, of that frame.
Figure 2B:
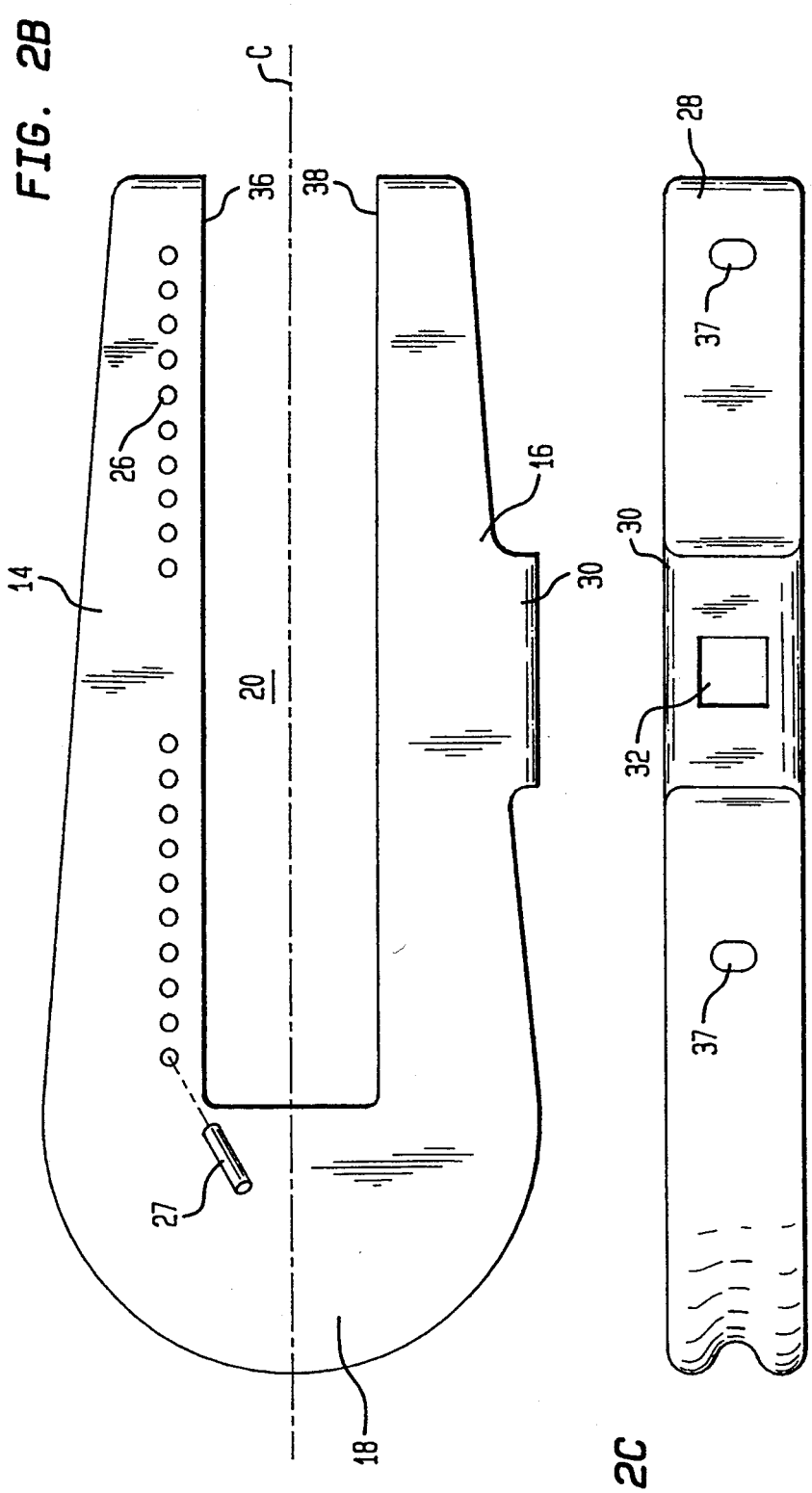
Figure 2C:
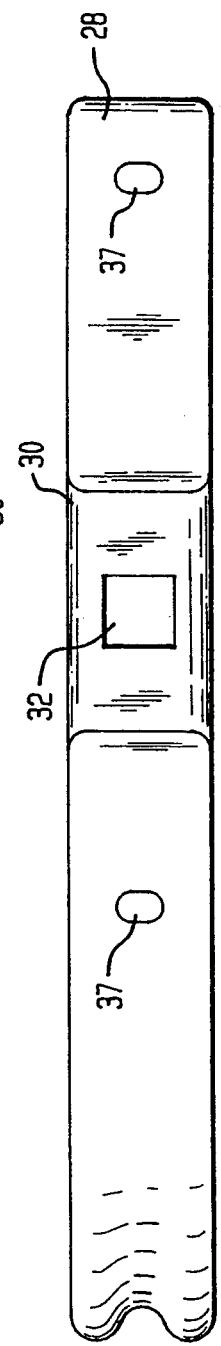

FIG. 2 illustrates a standard frame 12. FIG. 2A, a top view, shows the top 22 of upper leg 14 of frame 12 in which a channel 24 is cut. FIG. 2B shows the side view of standard frame 12. Highlighted in FIG. 2B are the apertures 26 which receive pins 27 to form stops preventing carriage 60 from sliding motion. FIG. 2C illustrates the bottom view of standard frame 12. Shown on the bottom 28 of lower leg 16 of frame 12 is a foot 30 on which frame 12 can stand. Foot 30 has an opening 32 which can receive a pole or stand for supporting frame 12. Holes 37 through bottom 28 receive bolts 148 to fix female die assembly 140 in place. The material used to construct frame 12 must be sufficiently strong to withstand the louver-forming operation; a steel alloy is suitable.

Clearly, frame 12 can be constructed to provide throat 20 with whatever dimensions of length, width, and height are desired. Thus, throat 20 of frame 12 can be made sufficiently large to form a louver in any location on work piece W by simply enlarging frame 12 during the manufacture of frame 12.

Throat 20 of frame 12 can also be made to receive a three-dimensional, non-flat work piece W. Work piece W may have lips, creases, folds, or curves; panels having such non-flat contours are common to the automotive, industrial, and electrical fields. Throat 20 can accommodate a large variety of panels by placing a cavity 34 at the rear of throat 20 (as shown in FIGS. 3A, 3B, and 3C) or by curving throat 20 (as shown in FIG. 3D).

Figure 3A:
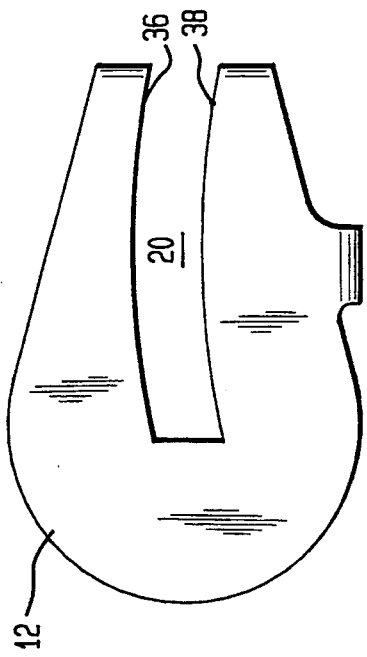
FIGS. 3A, 3B, 3C, and 3D illustrate various configurations of the throat formed in the frame.
Figure 3D:
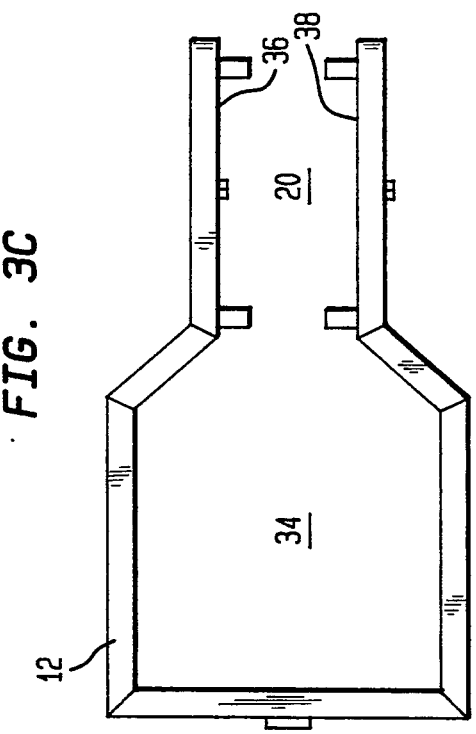
Figure 3B:
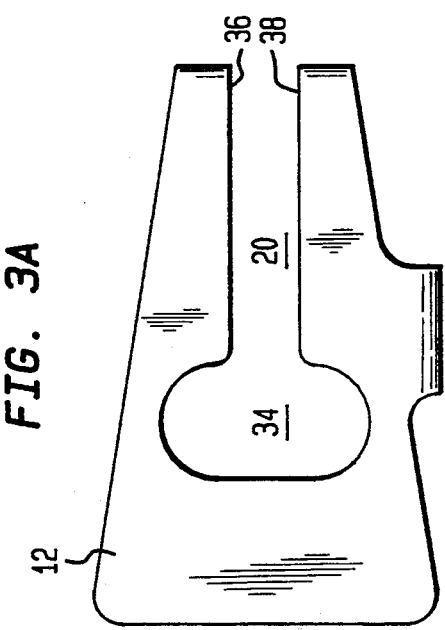
Figure 3C:
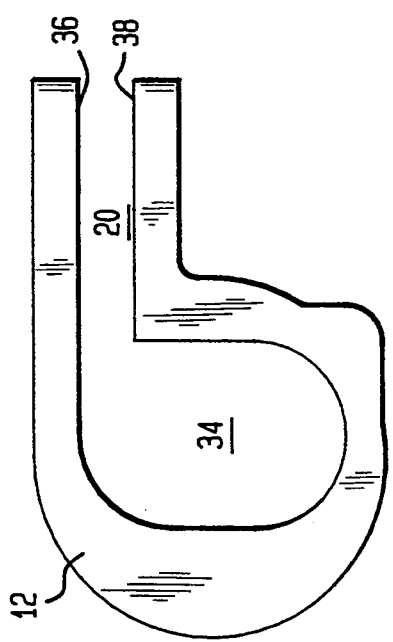

As illustrated in FIGS. 3A, 3B, and 3C, cavity 34 may have a number of different shapes. The shape of cavity 34 may be selected to accommodate a particular work piece W. Upper leg 14 of frame 12 has a lower face 36. Lower leg 16 of frame 12 has an upper face 38. Lower face 36 of upper leg 14 and upper face 38 of lower leg 16 of frame 12 preferably are parallel so that the faces 36, 38 which form throat 20 are the same distance apart throughout their entire length.

Carriage 60 of the present invention is illustrated in FIG. 4A (top view), FIG. 4B (side view), and FIG. 4C (front view). As shown in FIG. 4C, carriage 60 has a pair of arms 64, 66 which form a U-shaped area 68. On the bottom of carriage 60, preferably centrally positioned, is a flange 70. Flange 70 is used to affix a lever 80 (see FIG. 7), which carries male die 40, as explained below. A hollow, cylindrical sleeve 72 is affixed (e.g., welded) to the bottom of carriage 70 perpendicular to flange 70 and inside area 68. Thus, sleeve 72 is also centrally positioned on carriage 60. Sleeve 72 receives a first (horizontal) handle 120, by which the operator applies force to push or pull carriage 60 in the direction of arrows A and B (see FIG. 1), Turning to FIGS. 4A and 4B, located directly behind sleeve 72 is a hollow column 74. Column 74 receives a second (vertical) handle 122, by which the operator applies force to push or pull carriage 60 in the direction of arrows A and B (see FIG. 1). Each of first and second handles 120, 122 may be provided with a grip 124 to facilitate handling by the operator. Note that first handle 120 may be disposed on either side or on both sides of carriage 60 to accommodate right or left-handed operators.

FIGS. 5A and 5B show front and side views, respectively, of male die 40. The rounded shape of the body 44 of male die 40 (see FIG. 5B) is selected to create a corresponding and desired shape in the louver to be formed by tool 10. Male die 40 has a straight cutting edge 42 and a central hole 46. A bushing 48 is provided in hole 46 to facilitate rotation of male die 40. Cutting edge 42 is sufficiently sharp and hard to cut sheet metal. Suitable materials for the construction of male die 40 are steel and steel alloys.

It is envisioned that a collection of male dies will be provided and that a particular male die 40, having the desired shape of the louver to be formed, will be selected from that collection and used until a louver having a different shape is desired. To save costs, body 44 of male die 40 may be formed of a plastic or phenolic material and a separate cutting edge 42 of steel or steel alloy may be affixed to body 44. Such an alternative has the advantage of extending the life of the die collection; only the cutting edges will need to be replaced as they wear.

FIGS. 6A, 6B, and 6C illustrate the lever 80 of the present invention. FIG. 6A is a top view of lever 80 and shows that lever 80 has two limbs 76, 78 which create a U-shaped slot 86. A first bore 82 and a second bore 84 are formed horizontally in lever 80 through limbs 76, 78. Slot 86 encompasses flange 70 of carriage 60 when lever 80 is connected to carriage 60. Upon connection, second bore 84 of lever 80 is placed in a position parallel with bore 71 of flange 70. A second bolt 88 (see FIG. 7) then is inserted through bore 71 and second bore 84 to connect lever 80 with carriage 60. Lever 80 can rotate around the pivot point created by bolt 88.

Lever 80 carries male die 40 as shown in FIGS. 6B and 6C. A first bolt 90 is inserted through first bore 82 and hole 46 of male die 40 to affix male die 40 rotatably on lever 80. When male die 40 is affixed to lever 80, a significant portion of male die 40 extends below the bottom surface of male die 40 to allow cutting edge 42 of male die 40 to contact work piece W without interference by lever 80.

The bottom surface 126 of lever 80 may be angled to further minimize potential interference. Bottom surface 126 is shaped, at its nadir 128 just below the point at which male die 40 is attached to lever 80, to just contact work piece W during the final strokes of carriage 60—just after the louver has been completely formed. This geometry functions to flatten the sheet metal which may have been slightly bowed during the initial cutting and forming of that particular louver.

One or the other of limbs 76, 78 of lever 80 may be omitted. Although somewhat weaker, such a modified lever 80 can form louvers in areas where a lever 80 having two limbs 76, 78 cannot, including an operation in which a louver is formed in the reverse (opposite) side of an existing louver. That operation forms a louver positioned inward when viewed from one side of the panel and outward when viewed from the other side—while using the same sliced opening in work piece W.

Figure 7:
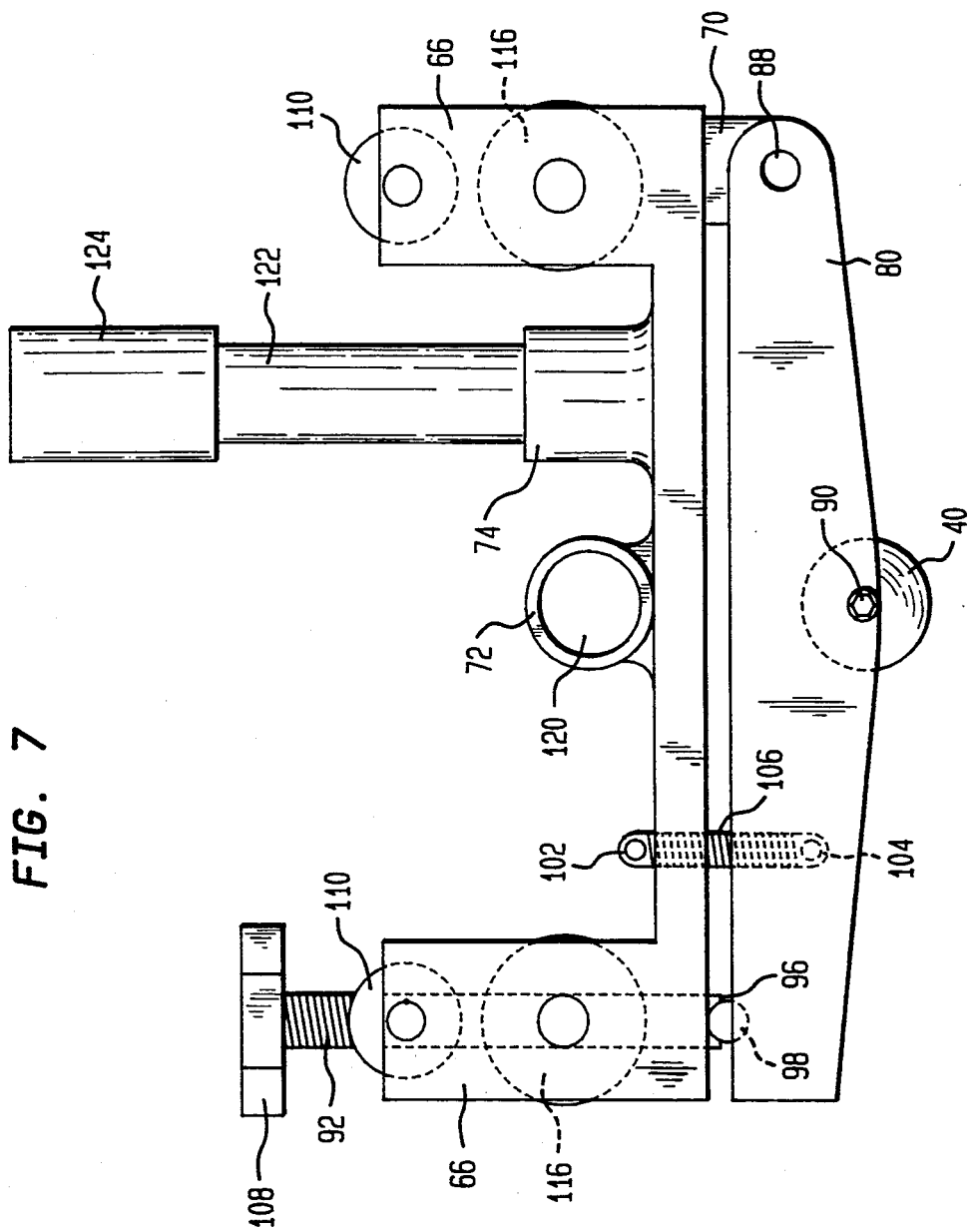
FIG. 7 shows the carriage and lever of the present invention in connection.

Turning to FIG. 7, which shows the carriage 60 and lever 80 as connected, an adjusting screw 92 is provided to pivot lever 80 about second bolt 88 and adjust male die 40 relative to work piece W. Adjusting screw 92 engages threaded passage 94 which is provided vertically through carriage 60 and which is preferably located in the center of carriage 60 (see FIG. 4A). The base 96 of adjusting screw 92 contacts a ball bearing 98 provided in an insert 100 located in lever 80 (see FIG. 6A).

An anchor 102 is affixed to the bottom of carriage 60 and a catch 104 is affixed to lever 80. A return spring 106 is attached on one end to anchor 102 and on its opposite end to catch 104. Return spring 106 exerts an upward force on lever 80, serving to pull lever 80 upward toward the bottom of carriage 60.

To adjust lever 80 and, hence, the pressure (if any) exerted between male die 40 and work piece W, the head 108 of adjusting screw 92 is rotated. When rotated in one direction, adjusting screw 92 travels down threaded passage 94 so that base 96 pushes downward on ball bearing 98 and, consequently, on lever 80 against the force of return spring 106. Male die 40 is placed in contact with work piece W or, if contact has already been made, the pressure exerted by male die 40 on work piece W is increased.

In contrast, when rotated in the opposite direction, adjusting screw 92 travels upward in threaded passage 94 so that return spring 106 can pull lever 80 upward toward the bottom of carriage 60. Male die 40 is removed from contact with work piece W or, if contact is maintained, the pressure exerted by male die 40 on work piece W is reduced.

Carriage 60 is mounted on upper leg 14 of frame 12 through sets of rollers. Carriage retainer rollers 110 are provided in mounts 112 at each end of carriage 60. Retainer rollers 110 engage a track 114 on upper leg 14 of frame 12. The engagement between retainer rollers 110 and track 114 counters the downward force of lever 80 and male die 40. Thus, retainer rollers 110 maintain carriage 60 in position relative to frame 12 and away from work piece W. (A pin and slot systems a securing bolt, or other alternate system may be substituted for retainer rollers 110 to perform this particular function.)

Carriage pressure rollers 116 are provided in mounts 118 at each end of carriage 60. Pressure rollers 116 allow for the back and forth motion of carriage 60 in the directions of arrows A and B (FIG. 1) to be smooth, easy, and precisely level or in line throughout the stroke of carriage 60. This allows the operator to propel male die 40 along work piece W.

The sideways (horizontal) motion of carriage 60 (perpendicular to the desired back and forth motion) is controlled and minimized by pressure rollers 116 and retainer rollers 110. Sufficient clearance (space) is maintained between the sides of upper leg 14 of frame 12 and arms 64, 66 of carriage 60 to just allow carriage movement back and forth with little or no sideward movement of carriage 60. This roller system also maintains cutting edge 42 of male die 40 and the shearing edge 144 of female die assembly 140 in a constant shear position. Thus, the sides of upper leg 14 of frame 12 and arms 64, 66 of carriage 60 pass each other with minimal or no contact yet assure that male die 40 can be pushed into its full position in former 142 of female die assembly 140 (see below).

The sheet metal work piece W in which the louver will be cut and formed must be clamped (held stable) for this operation. A pair of threaded securing screws 130, each having a knob 132 (permitting rotation of securing screw 130) and a platform 134, are suitable for clamping work piece W. A pair of threaded passages 136 may be provided vertically through upper leg 14 of frame 12 to receive securing screws 130. When knobs 132 are rotated in one direction, securing screws 130 travel downward in threaded passages 136 until platforms 134 trap work piece W against female die assembly 140. When knobs 132 are rotated in the opposite direction, securing screws 130 travel upward in threaded passages 136 until platforms 134 release work piece W.

Alternate clamping methods include a standard C clamp, a spring-loaded plungers an eccentric lever, or compound lever systems—each of which may be stationary or mobile.

Figure 8:
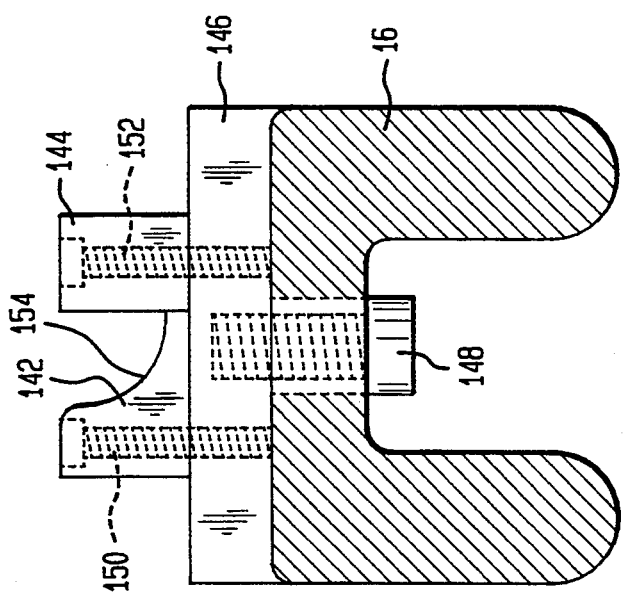
FIG. 8 illustrates the female die assembly of the present invention in partial cross-section.
Figure 9E:
FIGS. 9A, 9B, 9C, 9D, and 9E show, in end views, some of the various configurations possible for the former of the female die assembly.
Figure 9D:
Figure 9C:
Figure 9B:
Figure 9A:

Female die assembly 140 is supported on the upper surface of lower leg 16 of frame 12 in throat 20, as illustrated in FIG. 8, by a mounting plate 146. Plate 146 of female die assembly 140 is affixed to lower leg 16 by bolts 148. Plate 146 may be made of ordinary metal stock. Female die assembly 140 also includes a die former 142 and a shearing edge 144. Former 142 and shearing edge 144 are affixed to plate 146 by, for example, bolts 150 and 152, respectively.

The shape of the louver formed by tool 10 is defined by the rounded shape of body 44 of male die 40 (see FIG. 5B) and by the rounded groove 154 of former 142 of female die assembly 140. FIGS. 9A, 9B, 9C, 9D, and 9E show, in end views, some of the various shapes possible for groove 154 of former 142 of female die assembly 140. Former 142 may be made of inexpensive plastic, phenolic, or the like.

One problem with prior art louver-forming machines is that the shearing edge of the female die wears out quickly. This is especially problematic because the shearing edge must be made of a relatively expensive, high-strength material such as nickel or high carbon hardened steel. To overcome this problem, shearing edge 144 of female die assembly 140 is configured as a rectangular rod having a number of apertures on each of its four sides to receive bolts 152. Thus, shearing edge 144 may be rotated periodically to bring a new, sharp edge into operation. Shearing edge 144 need be replaced only after all four working edges are worn and a cost savings is realized. Alternatively, shearing edge 144 may be formed as a plastic base on top of which is affixed a relatively thin, hardened steel plate. Such a plate would have four cutting edges and could be rotated as described above.

Figure 10A:
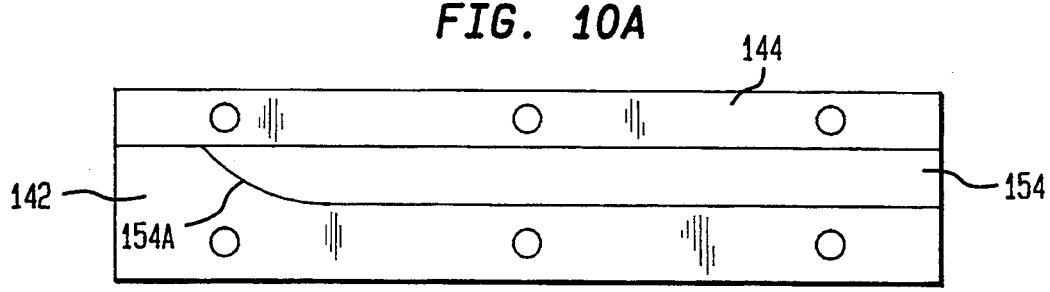
FIG. 10A is a top view of the former of the female die assembly.
Figure 10B:
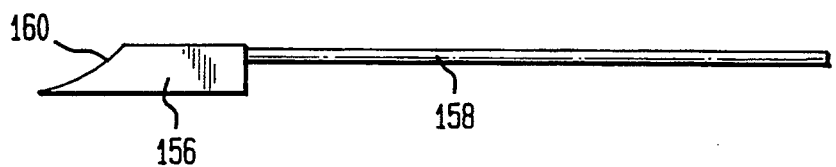
FIG. 10B is a top view of the mating end of the former.
Figure 10C:
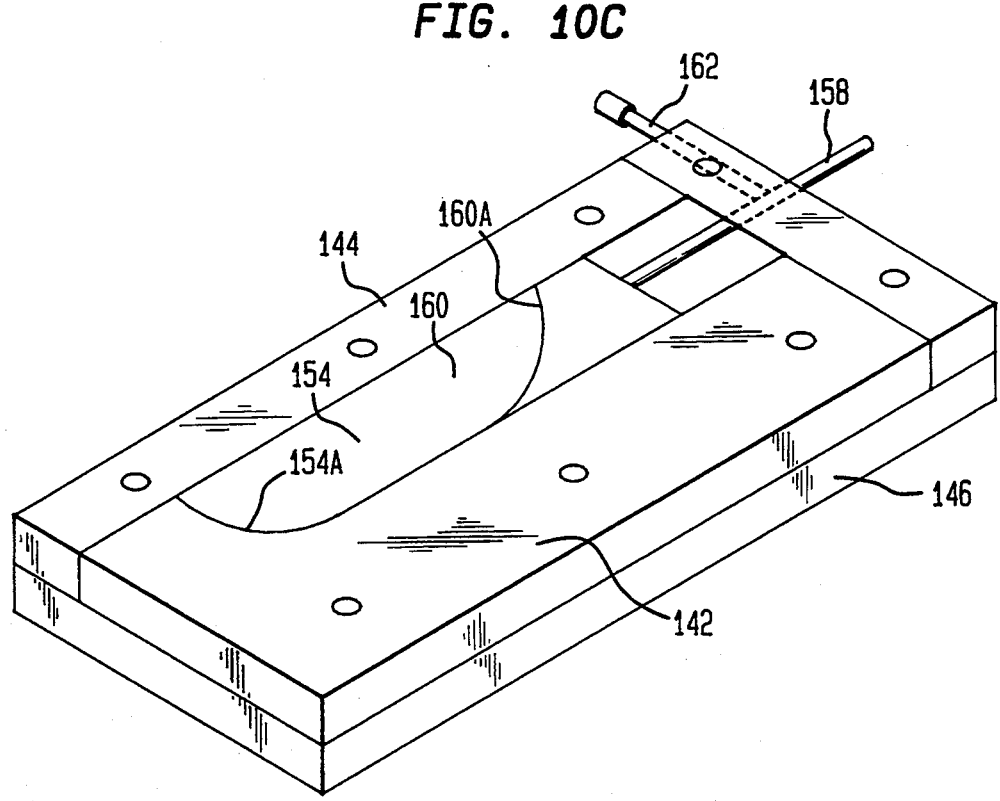
FIG. 10C is a perspective view of the mating end in use with the former.

FIGS. 10A, 10B, and 10C illustrate how the length of former 142 may be made adjustable by providing a mating end 156. FIG. 10A is a top view of former 142, having groove 154, in position against shearing edge 144. FIG. 10B is a top view of mating end 156. Although not required, the material used to construct mating end 156 may be the same material as that used to construct former 142.

It is required that mating end 156 have a mating groove 160 which corresponds in shape to groove 154 of former 142. It is also required that mating end 156 have a curve 154A which matches curve 160A in former 142. Curves 154A and 160A form the ends of the louver. Mating end 156 is provided with an adjusting rod 158 affixed to its end opposite curve 160A. Adjusting rod 158 may be constructed of spring steel.

As shown in FIG. 10C, which is a perspective view of mating end 156 in use with former 142, the operator can adjust the length of groove 154 of former 142 and, therefore, the length of the resulting louver, by grasping adjusting rod 158 and sliding mating end 156 in groove 154. Once the desired length is achieved, the operator can set that length by securing adjusting rod 158 of mating end 156 with, for example, a set screw 162.

Another drawback of prior art louver-forming machines is their inability to form louvers in odd-shaped sheet metal panels. The panels often are not flat; they are more commonly curved. Tool 10 of the present invention accommodates a variety of panels by providing alternative constructions for plate 146 of female die assembly 140 and track 114 of upper leg 14 of frame 12.

Figure 11:
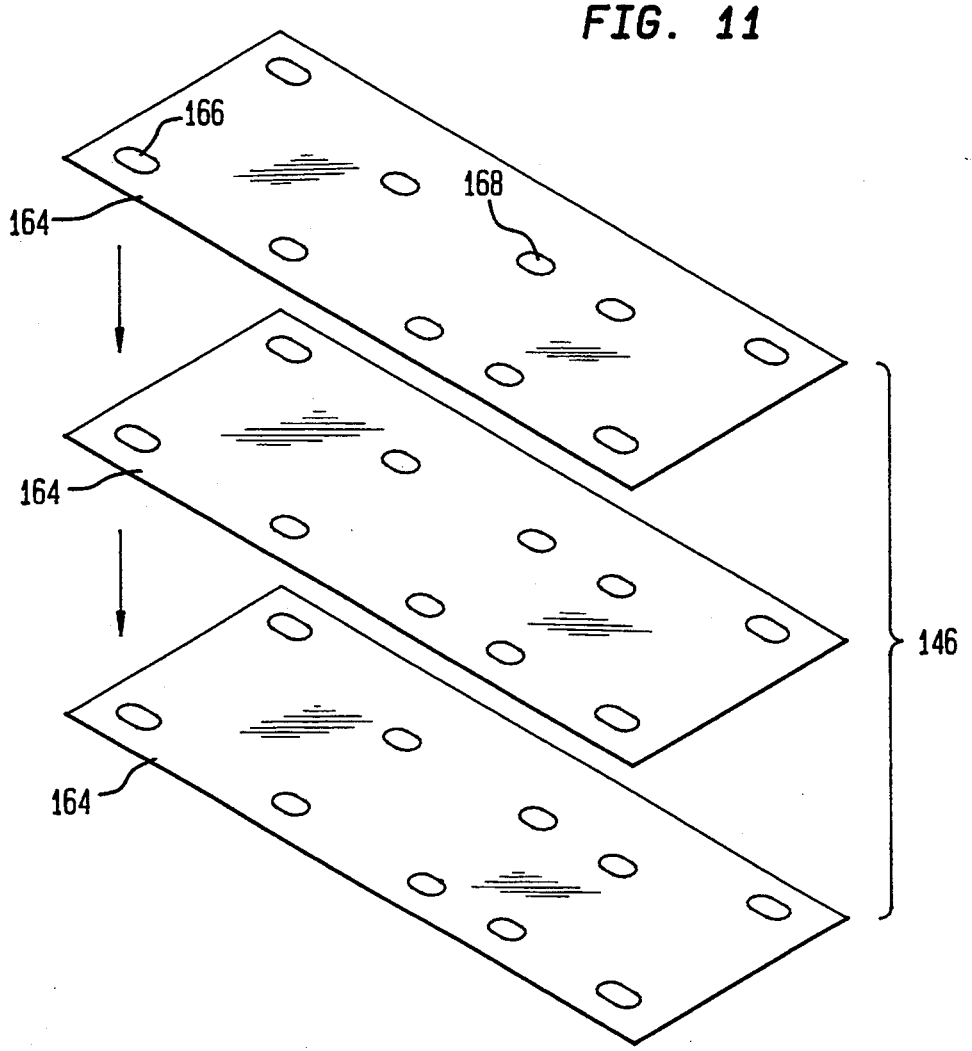
FIG. 11 illustrates one embodiment of the plate of the female die assembly in which the plate is constructed as a composite of layers.

Typically, plate 146 is a solid piece of ordinary metal stock. That configuration is suitable when work piece W is substantially flat. As shown in FIG. 11, plate 146 may be constructed as a composite of layers 164 of thin spring steel or other similar material having slots 166 and holes 168. Such a construction allows plate 146 to flex and, thereby, to accommodate a curved work piece W.

Figure 11A:
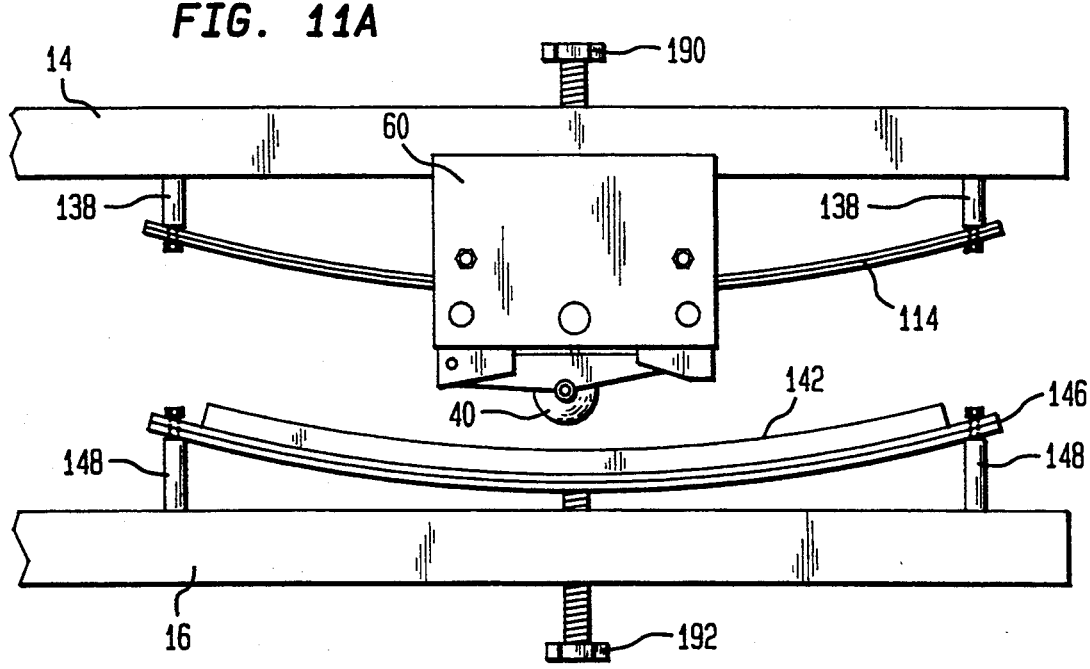
FIG. 11A is a side view of the invention in which the plate of the female die assembly and the track of the upper leg of the frame are constructed to form a louver in a curved work piece.

FIG. 11A is a side view of the invention in which flexible plate 146 (as shown in FIG. 11) of female die assembly 140 and flexible track 114 of upper leg 14 of frame 12 are constructed to form a louver in a curved work piece W. Flexible track 114 may be formed in a manner similar to flexible plate 146 (see FIG. 11); holes 168 are not required in flexible track 114. Flexible track 114 forms a flexible travel surface for pressure rollers 116 and carriage 60.

Slots 166 in flexible plate 146 are provided near the ends of flexible plate 146 to receive bolts 148 and are elongated to provide sufficient play or movement for the various layers 164 of flexible plate 146 to flex in different amounts. Bolts 148 affix flexible plate 146 to lower leg 16 of frame 12. Using holes 168 and corresponding bolts (not shown), former 142, shearing edge 144, mating end 156, adjusting rod 158, and set screw 162 are mounted on flexible plate 146. Similarly, slots are provided near the ends of flexible track 114 to receive posts 138 and are elongated to provide sufficient play or movement for the various layers of flexible track 114 to flex in different amounts. Posts 138 affix flexible track 114 to upper leg 14 of frame 12.

Flexible track 114 and flexible plate 146 can be forced to deviate from their normal planar shape by, for example, a knob and screw system. The system includes a first knob and screw 190 fitted to upper leg 14 and a second knob and screw 192 fitted to lower leg 16. By turning knob and screw 190 on upper leg 14 in one direction, flexible track 114 is forced (pushed) into an adjustable convex curve. Rotation of knob and screw 190 in the opposite direction releases the pressure exerted on flexible track 114 and allows flexible track 114 to return toward its planar shape. Further rotation will pull flexible track 114 into an adjustable concave curve.

Similarly, by turning knob and screw 192 on lower leg 16 in one direction, flexible plate 146 (and the components mounted on flexible plate 146) are forced (pushed) into an adjustable concave curve. Rotation of knob and screw 192 in the opposite direction releases the pressure exerted on flexible plate 146 and allows flexible plate 146 to return toward its planar shape. Further rotation will pull flexible plate 146 into an adjustable convex curve, Both knob and screw 190 and knob and screw 192 must be set equally to allow smooth travel of carriage 60. Knob and screw 190, knob and screw 192, flexible track 114, and flexible plate 146 can be adjusted in unison to accommodate any curve in work piece W.

The length of the louver cut and formed by tool 10 is rendered adjustable by one of several alternative mechanisms. Each mechanism must perform two functions: (1) define the length of groove 154 in former 142 of female die assembly 140, and (2) define the distance travelled by carriage 60.

Figure 12:
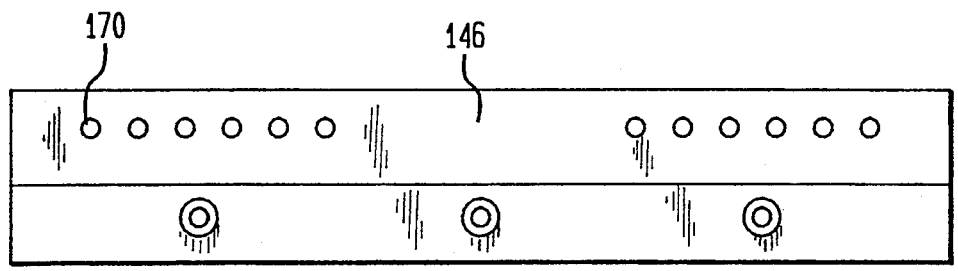
FIG. 12 provides a top view of one mechanism by which the length of the louver cut and formed by the tool of the present invention is rendered adjustable, namely, a pin-in-index hole mechanism.

A pin-in-hole index system is illustrated in FIGS. 1 and 2B and in FIG. 12, Numerous; pre-measured, index holes 170 may be placed in plate 146 of female die assembly 140 (FIG. 12). Index holes 170 accept a bolt or pin from mating end 156, allowing the ends of mating end 156 to be positioned anywhere along plate 146. Both left and right sides of upper leg 14 of frame 14 have indexed apertures 26 for receiving one or more pins 27. Pins 27 are placed to stop carriage 60 at the end of each stroke just before male die 40 strikes the ends of groove 154 in former 142 of female die assembly 140.

Figure 13:
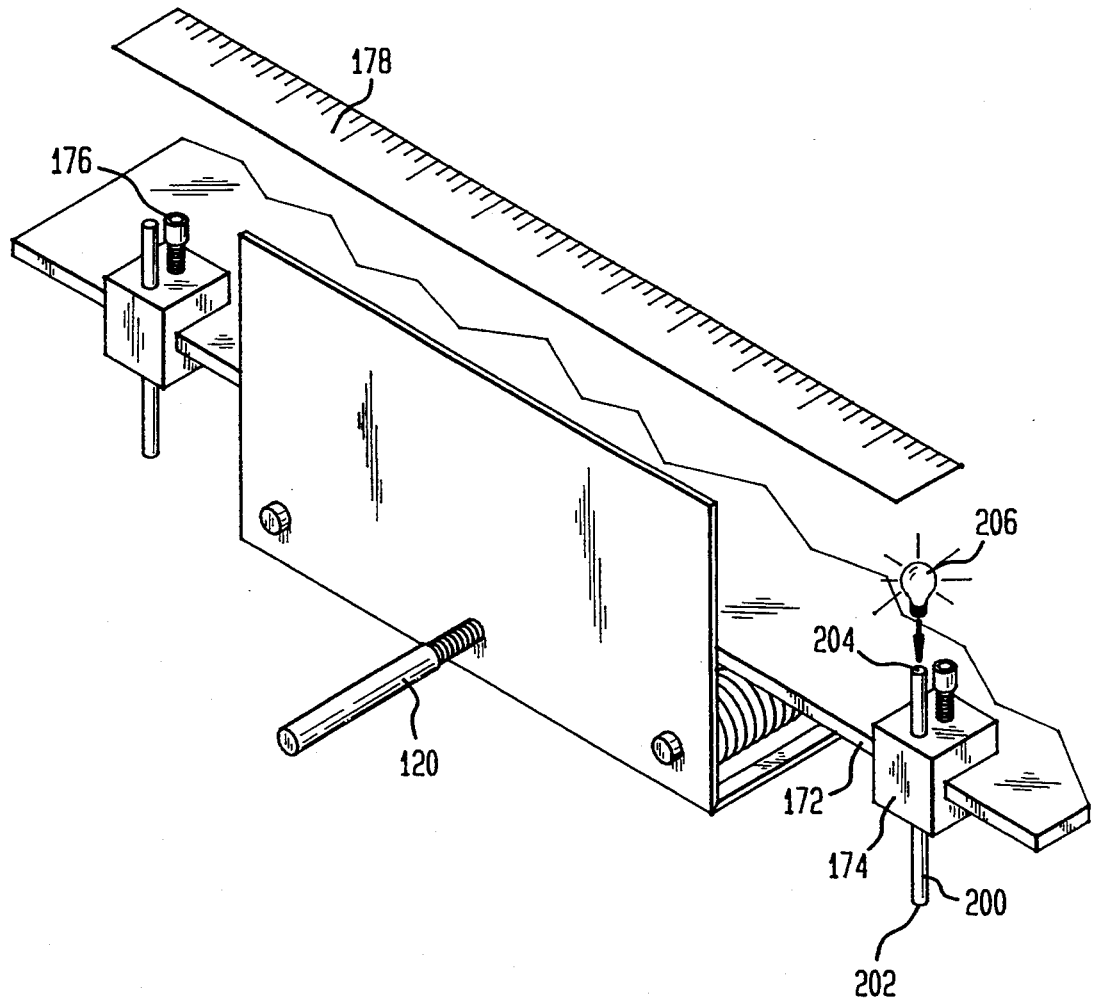
FIG. 13 illustrates an alternative mechanism to that shown in FIG. 12, namely, locking stops which slip along slides.

An alternate adjustment mechanism is illustrated in FIG. 13. One or more slides 172 are provided longitudinally on frame 12. Slides 172 can have a variety of cross sections, including round, square, and the like. Locking stops 174 slip along slides 172 and can adopt any position along slides 172. Once in the desired position, locking stops 174 can be fixed by, for example, set screws 176. Slides 172 and locking stops 174 can be used to control the travel of carriage 60.

Another suitable adjustment mechanism, not shown in the Drawing, includes a threaded rod. The rod can be threaded through a stationary base located at the ends of the female die assembly 140 and the area of throat 20 in which movement of carriage 60 is desired. By rotating the threaded rod a precise amount, the length of former 142 and the travel of carriage 60 can be controlled.

A numerical scale 178 in inches or millimeters may be added to each of the mechanisms described above for the convenience of the operator in setting accurate lengths for louver formation.

Figure 14A:
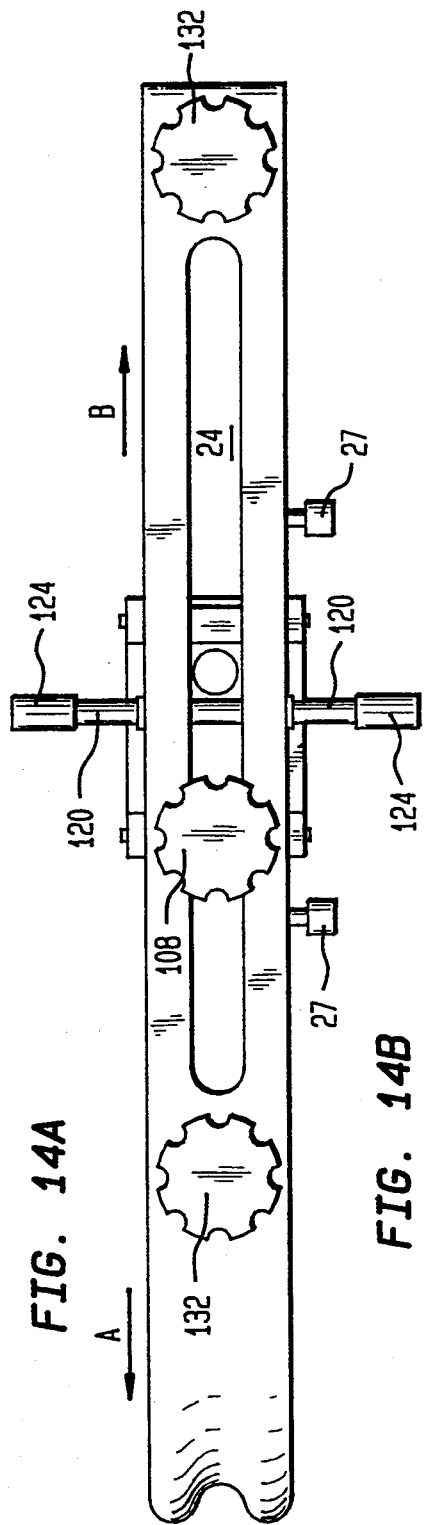
FIG. 14A is a top view and FIG. 14B is a front view of the tool of the present invention as assembled and ready to cut and form a louver.
Figure 14B:
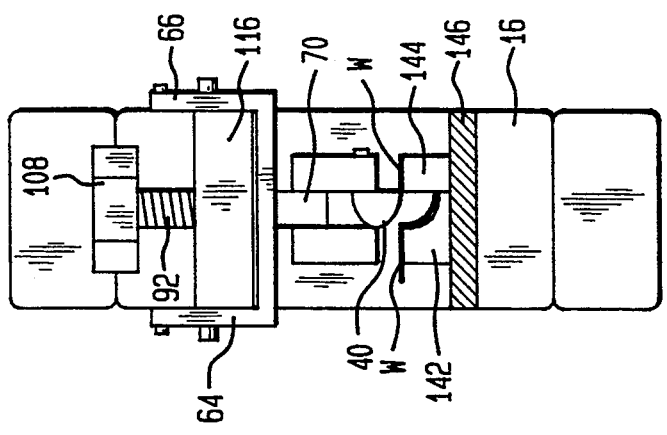

The operation of tool 10 will be described with reference, specifically, to FIGS. 14A and 14B. FIG. 14A is a top view of tool 10 as assembled and ready to cut and form a louver. FIG. 14B is a front views with the lower section of securing screw 130 removed, of tool 10 as assembled and ready to cut and form a louver.

First, tool 10 must be set to cut and form a louver of the desired shape. The length of the louver being cut and formed depends upon where carriage 60 stops. Thus, the distance travelled by carriage 60 must be set, for example, by inserting pins 27 into apertures 26 in upper leg 14 of frame 12. The length of former 142 of female die assembly then must be set to a dimension corresponding (equal) to the distance travelled by carriage 60 so that male die 40 stops just before striking the ends of groove 154 in former 142.

The distance travelled by carriage 60 and the corresponding length of groove 154 are adjustable from zero to as long as desired using one of the adjustment mechanisms disclosed above and a frame design which has a throat 20 (in which the louver is formed) of appropriate dimensions. Throat 20 must accommodate a former 142 long enough to form the desired length louver.

The depth, width, and shape of the louver are controlled by the shape and size of former 142 of female die assembly 140 and the shape of body 44 of male die 40. Thus, an appropriate female die assembly 140 and a matching male die 40 must be selected.

After selecting the appropriate components and settings of tool 10, work piece W is inserted over fixed female die assembly 140, bridging former 142 and shearing edge 144. Knobs 132 are then turned until platforms 134 firmly hold work piece W in place. Adjusting screw 92 is then turned, using screw head 108, until male die 40 engages work piece W with some force.

Male die 40 is then moved longitudinally in a back and forth motion (in the directions of arrows A and B in FIGS. 1 and 14A) and is held in shear with shearing edge 144 of female die assembly 140. Only a minimal, adjustable gap exists between cutting edge 42 of male die 40 and shearing edge 144 of female die assembly 140 when male die 40 is pushed into female die assembly 140 by the force of adjusting screw 92. The cutting and forming force exerted on sheet metal work piece W is generated, therefore, by rotating adjusting screw 92. Carriage 60, lever 80, and male die 40 are then rolled back and forth, along the sheet metal work piece W (in a motion similar to rolling bread dough) and in the direction of arrows A and B, using handles 120.

The rolling motion continues until additional shearing force is required. Then, adjusting screw 92 is rotated, further pushing male die 40 into work piece W, and the rolling motion resumed. This process continues until the louver is formed in work piece W—as shown in FIG. 14B. A minimum number of work cycles are necessary to cut and form the louver. The rolling motion and the small gap which exists between cutting edge 42 of male die 40 and shearing edge 144 of female die assembly 140 prevent scores, mars, and distortion in work piece W during cutting and forming a louver.

Although the power necessary to operate tool 10 and to cut and form a louver can be supplied by hand, a small, electric, air, or hydraulic motor system may be substituted. In addition, handles may be provided on frame 12 to control movement of frame 12 between cycles of back and forth motions. Such handles are especially helpful when tool 10 is in portable use.

In the embodiment discussed above, the cutting and forming force exerted on work piece W is generated by rotating adjusting screw 92. FIGS. 15A (end view) and 15B (side view) illustrate an alternative embodiment for generating that force. Carriage 60 is provided with a pair of oppositely disposed, threaded nuts 180. Right first handle 120a and left first handle 120b are each provided with correspondingly threaded screw ends 182. Centrally located in carriage 60 is a pivotable cam 184. Cam 184 pivots around bar 186, fixed in upright 188, and extends below the bottom of carriage 60 to contact lever 80.

First handles 120 are used, by activating cam 184, to generate the cutting and forming force exerted on work piece W. Initially, one of first handles 120 (left first handle 120b, for example) is screwed into its corresponding nut 180. That action will flip cam 184 to the right (the position shown in FIG. 15A) and prevent cam 184 from flipping back to the left of upright 188. Then, the opposite first handle 120 (right first handle 120a, in the example) is rotated a sufficient amount until cam 184 pivots about bar 186 and contacts the top of lever 80. As right first handle 120a continues to be rotated, cam 184 will push downward on lever 80 against the force of return spring 106 which will, in turn, force male die 40 downward and into contact with work piece W. The more right first handle 120a is rotated, the more force is applied by male die 40 on work piece W.

The embodiment shown in FIGS. 15A and 15B offers a number of advantages. First, the force required to cut and form a louver in work piece W is controlled by first handle 120—the same handle used to impart rolling motion to carriage 60. The separate step of stopping the operation to apply force through adjusting screw 92 is avoided. In addition, right and left-handed operators are both accommodated because cam 184 may be set initially to the right or to the left of upright 188 so that either the right or left hand may be used to control the cutting and forming force.

It is often desired to form a number of louvers in the same work piece W in parallel or in both longitudinal and transverse directions. An indexing or guidance system is provided, therefore, to assure the accurate location of each formed louver. The guidance system of the present invention has several embodiments.

First, the thicknesses of both shearing edge 144 and former 142 of female die 140 can be varied to correspond with the desired spacing between louvers. Properly chosen thicknesses allow work piece W to be indexed and the next, subsequently formed louver to be formed exactly parallel to the louver formed before (both ends of the louvers being exactly the same distance apart). This is accomplished by pushing the protruding louver previously formed against the back side of shearing edge 144 or the back side of former 142. The space between the louvers can be controlled within one-half of a louver width using this guidance system.

An alternate guidance system for alignment of the louvers is shown in FIG. 13. That system includes small, hollow tubes 200 fixed to the adjustable locking stops 174. Tubes 200 are disposed vertically (perpendicular to longitudinal axis C). The lower ends 202 of tubes 200 each have a small pin hole (not shown). The openings in the opposite (upper) ends 204 of tubes 200 are sufficiently large to accept a light source 206 such as a fiber optic, a flexible neck flashlight with a remote bulb, or the like. When light source 206 is turned on, a pinpoint of light will project downward onto female die assembly 140 from each locking stop 174.

Figure 16A:
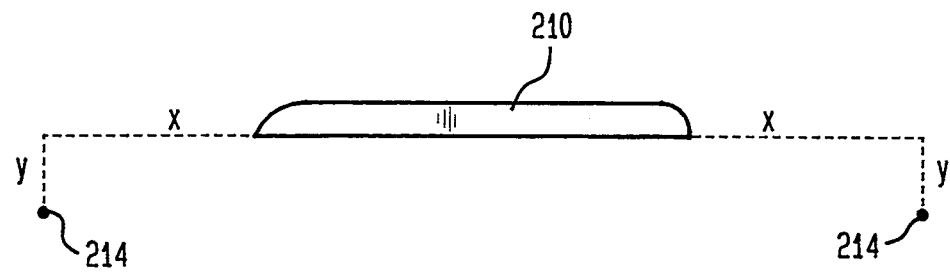
FIGS. 16A and 16B illustrate the operation of one embodiment of the guidance system of the present invention.
Figure 16B:
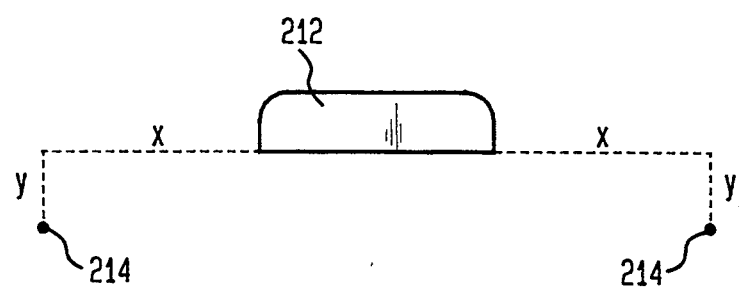

FIGS. 16A and 16B illustrate the operation of the second embodiment of the guidance system. FIGS. 16A and 16B differ only in the size (length, width, and depth) of the louver being formed by tool 10. The louver 210 of FIG. 16A is longer, thinner, and (not evident from the Drawing) shallower than is the louver 212 of FIG. 16B. Despite the differences in the sizes of louvers 210 and 212, the dimensions from the ends of the louvers (x) and from the sides of the louver (y) to the pinpoints of light 214 which project downward onto female die assembly 140 from each locking stop 174 will be constants. These dimensions (x and y) can be transferred to work piece W. Once transferred to work piece W, the dimensions will form relative points at a precise, known distance from the actual locations of louver corners. When the pinpoint of light 214 from each tube 200 set on locking stops 174 strikes those relative points which were transferred to metal piece W, the exact location of the next louver to be formed is known.

The guidance system operates basically like the grid of a football fields with the side line of the field controlling the sideways location of the louver and the individual ten-yard lines locating the space between the adjacent louvers. Where the ten-yard line and the side line meet at each side of the field is where pin-point of light 214 will shine (work piece W having been moved to properly locate the light). Thus, the precise location of the louvers can be constantly controlled.

A third embodiment of the guidance system simply substitutes pointers (not shown) for tubes 200. These pointers project down, as do pin-points of light 214 in the second embodiment, and stop just before contacting work piece W. Otherwise, the operation of this third embodiment, including transfer of the dimensions to work piece W, is similar to the operation of the second embodiment described above. A fourth embodiment simply eliminates light source 206, tubes 200 may be used as sight tubes to visually locate the relative points which were transferred to metal piece W.

Figure 17:
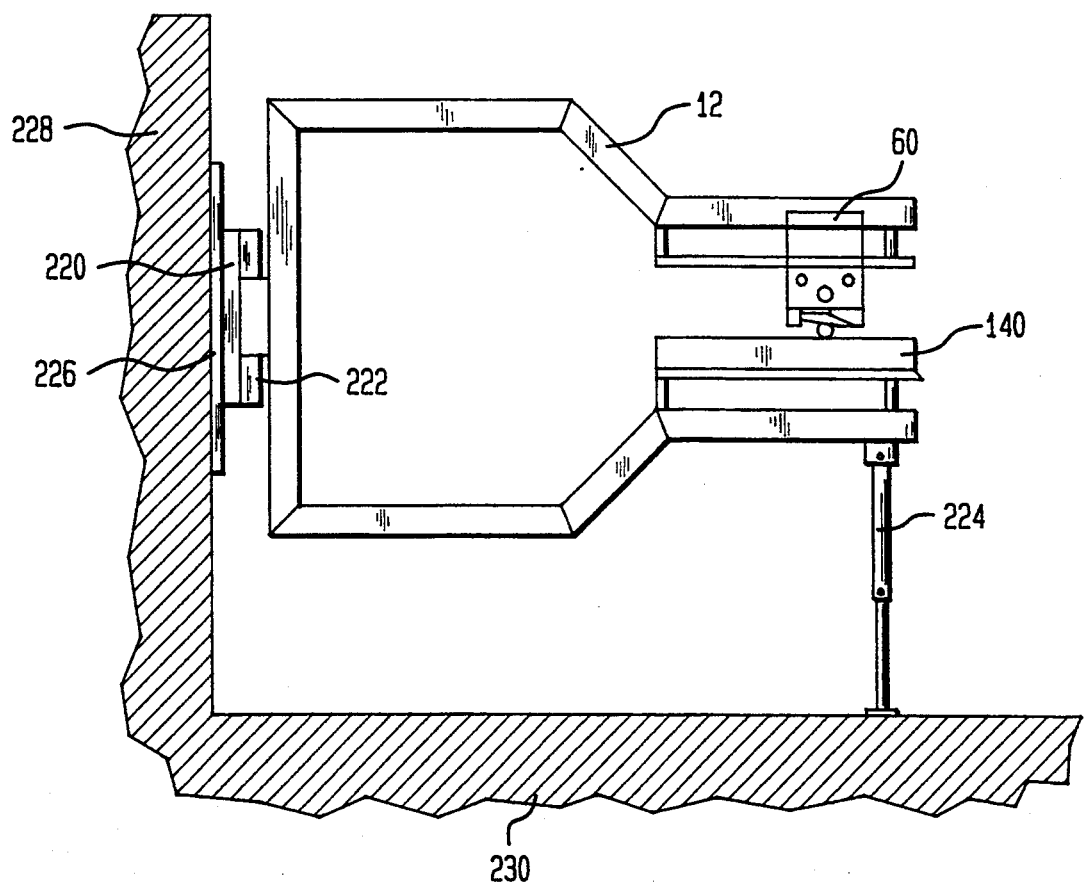
FIG. 17 shows the tool of the present invention as mounted to a stand constructed specifically for its use.

Tool 10 can be easily mounted in a standard bench vice or on a standard motor stand. Tool 10 is sufficiently light, weighing approximately fifty pounds, to be moved easily. That characteristic facilitates use of tool 10 when work piece W cannot be brought to a fixed tool. Alternatively, as shown in FIG. 17, tool 10 can be mounted to a stand constructed specifically for its use. When so mounted, tool 10 may be constructed as a heavier, sturdier structure—if increased durability and a wider range of capability are desired at the expense of portability.

A plate 220 may be provided for attachment to a pre-existing structure, such as a stand or wall 228. A bracket 226 may facilitate such attachment. Frame 12 of tool 10 may be attached (bolted, soldered, welded, or the like) either directly to plate 220 or to a hinge 222 which is, in turn, attached to plate 220. Hinge 222 would allow tool 10 to be folded flat against wall 228 when tool 10 is not in use.

Tool 10 is supported on its end opposite plate 220 by an adjustable leg 224. As shown in FIG. 2C, adjustable leg 224 may be affixed to foot 30 of lower leg 16 of frame 12 in opening 32. The height of adjustable leg 224 may be varied to engage a floor 230, a table (not shown), or other similar structure. Wall mounting facilitates the use of the tool 10 when work piece W can be brought to the tool.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention. Specifically, a stationary male die could be mounted in a planar surface and a female die assembly could be formed as a curved shape and mounted in a mobile carriage.

What is claimed is:

1. A portable tool for cutting and forming louvers in a sheet metal work piece comprising:
    a substantially C-shaped frame having a longitudinal axis and an upper leg, a lower leg, and a body forming a throat in which the louvers are cut and formed;
    a female die assembly mounted on said lower leg of said frame in said throat;
    a male die having a cutting edge which cuts the louvers and a body which forms the louvers;
    means for rotatably carrying said male die in said throat, said carrying means adapted to slide longitudinally along said upper leg of said frame;
    means for defining the length of travel of said carrying means;
    means for holding the work piece between said female die assembly and said male die; and
    means for applying an increasing cutting and forming force to said male die, and against the work piece and said female die assembly, until a louver is cut and formed in the work piece.

2. A louver-forming tool as claimed in claim 1 wherein said frame forms a throat having a rear and a cavity positioned at said rear of said throat.

3. A louver-forming tool as claimed in claim 1 wherein said frame forms a curved throat.

4. A louver-forming tool as claimed in claim 1 wherein said upper leg of said frame has a lower face and said lower leg of said frame has an upper face parallel to said lower face of said upper leg.

5. A louver-forming tool as claimed in claim 1 wherein said carrying means includes a carriage and rollers, said carriage slidably mounted on said upper leg of said frame by said rollers.

6. A louver-forming tool as claimed in claim 5 wherein said carriage has at least one handle adapted to impart sliding force to said carriage.

7. A louver-forming tool as claimed in claim 5 wherein said upper leg of said frame has a track and at least one of said rollers engage said track.

8. A louver-forming tool as claimed in claim 5 wherein said carrying means further includes a lever having a first end and a second end and said carriage has a bottom surface, said lever pivotably affixed to said bottom surface of said carriage at said first end of said lever.

9. A louver-forming tool as claimed in claim 8 wherein said lever has a bottom surface and said male die is rotatably carried by said lever and extends below said bottom surface of said lever to cut and form the louvers without interference from said lever.

10. A louver-forming tool as claimed in claim 9 wherein said bottom surface of said lever has a shape adapted to just contact the work piece when the louvers are completely formed.

11. A louver-forming tool as claimed in claim 8 wherein said carrying means further includes a return spring having one end connected to said carriage and an opposite end connected to said second end of said lever opposite said first end of said lever which is pivotably affixed to said bottom surface of said carriage, said return spring exerting an upward force on said lever pulling said lever toward said carriage.

12. A louver-forming tool as claimed in claim 11 wherein said carrying means further includes an adjusting screw adapted to push downward on said lever against the force of said return spring to place said male die in contact with the work piece with desired force.

13. A louver-forming tool as claimed in claim 11 wherein said carrying means further includes a pivotable cam adapted to push downward on said lever against the force of said return spring to place said male die in contact with the work piece with desired force.

14. A louver-forming tool as claimed in claim 13 wherein said carriage has at least one handle adapted to impart sliding force to said carriage and to pivot said cam.

15. A louver-forming tool as claimed in claim 5 wherein said upper leg of said frame has sides and at least one of said rollers is a pressure roller adapted to maintain clearance between said sides of said upper leg and said carriage, whereby said carriage slides longitudinally along said upper leg without sideward movement.

16. A louver-forming tool as claimed in claim 1 wherein said female die assembly supports the work piece and has:
 a mounting plate for mounting said female die assembly to said lower leg of said frame;
 a shearing edge which, in combination with said cutting edge of said male die, cuts the louvers, and
 a die former defining a groove which, in combination with said body of said male die, forms the louvers, said shearing edge and said die former affixed to said mounting plate.

17. A louver-forming tool as claimed in claim 16 wherein said female die assembly further has an adjustable mating end having a mating groove which corresponds in shape with said groove of said die former, said adjustable mating end adapted to engage said die former and to adjust the length of said groove of said die former, whereby the length of the louvers formed is adjusted.

18. A louver-forming tool as claimed in claim 1 wherein:
 said carrying means includes a carriage and rollers, said carriage slidably mounted on said upper leg of said frame by said rollers;
 said upper leg of said frame has a flexible track constructed as a composite of layers and at least one of said rollers engage said track; and
 said female die assembly supports the work piece and has a flexible mounting plate for mounting said female die assembly to said lower leg of said frame, said flexible mounting plate constructed as a composite of layers.

19. A louver-forming tool as claimed in claim 18 further comprising means for imparting flexure to said flexible track and to said flexible mounting plate.

20. A louver-forming tool as claimed in claim 1 wherein said means for defining the length of travel of said carrying means includes a pin-in-hole index system.

21. A louver-forming tool as claimed in claim 1 wherein said means for defining the length of travel of said carrying means includes a slide provided longitudinally on said frame and a pair of locking stops adapted to be moved to a multiplicity of fixed positions along said slide.

22. A louver-forming tool as claimed in claim 1 further including a guidance system locating the louvers to be formed in the work piece.

23. A louver-forming tool as claimed in claim 22 wherein:
 said female die assembly has a shearing edge which cuts the louvers and a die former defining a groove which forms the louvers, each of said shearing edge and said die former having a thickness; and
 said guidance system includes varying the thickness of said die former and the thickness of said shearing edge to correspond with the desired spacing between louvers.

24. A louver-forming tool as claimed in claim 22 wherein:
 said means for defining the length of travel of said carrying means includes a slide provided longitudinally on said frame and a pair of locking stops adapted to be moved to a multiplicity of fixed positions along said slide; and
 said guidance system includes a pair of hollow sight tubes each disposed vertically in one of said pair of locking stops.

25. A louver-forming tool as claimed in claim 22 wherein:
 said means for defining the length of travel of said carrying means includes a slide provided longitudinally on said frame and a pair of locking stops adapted to be moved to a multiplicity of fixed positions along said slide; and
 said guidance system includes a pair of pointers each disposed vertically in one of said pair of locking stops.

26. A portable tool for cutting and forming louvers in a sheet metal work piece comprising:
 a substantially C-shaped frame having a longitudinal axis and an upper leg with a track, a lower leg, and a body forming a throat in which the louvers are cut and formed;
 a male die having a cutting edge which cuts the louvers and a body which forms the louvers;
 a female die assembly supporting the work piece and having:
  (a) a mounting plate for mounting said female die assembly to said lower leg of said frame in said throat,
  (b) a shearing edge which, in combination with said cutting edge of said male die, cuts the louvers, and
  (c) a die former defining a groove which, in combination with said body of said male die, forms the louvers, said shearing edge and said die former affixed to said mounting plate;
 a carriage adapted to slide longitudinally along said upper leg of said frame and having a bottom surface;
 rollers at least one of which slidably mounts said carriage on said track of said upper leg of said frame;
 a lever having:
  (a) a first end, said lever pivotably affixed to said bottom surface of said carriage at said first end of said lever,
  (b) a second end, and
  (c) a bottom surface, said male die rotatably carried by said lever in said throat and extending below said bottom surface of said lever to cut and form the louvers without interference from said lever;
 a return spring having one end connected to said carriage and an opposite end connected to said second end of said lever opposite said first end of said lever which is pivotably affixed to said bottom surface of said carriage, said return spring exerting an upward force on said lever pulling said lever toward said carriage;

a pivotable cam adapted to push downward on said lever against the force of said return spring to place said male die in contact with the work piece with desired force;

means for defining the length of travel of said carriage;

means for holding the work piece between said female die assembly and said male die; and means for applying an increasing cutting and forming force to said male die, and against the work piece and said female die assembly, until a louver is cut and formed in the work piece.

27. A louver-forming tool as claimed in claim 26 wherein said carriage has at least one handle adapted to impart sliding force to said carriage and to pivot said cam.

28. A louver-forming tool as claimed in claim 26 wherein said bottom surface of said lever has a shape adapted to just contact the work piece when the louvers are completely formed.

29. A louver-forming tool as claimed in claim 26 wherein said upper leg of said frame has sides and at least one of said rollers is a pressure roller adapted to maintain clearance between said sides of said upper leg and said carriage, whereby said carriage slides longitudinally along said upper leg without sideward movement.

30. A louver-forming tool as claimed in claim 26 wherein said female die assembly further has an adjustable mating end having a mating groove which corresponds in shape with said groove of said die former, said adjustable mating end adapted to engage said die former and to adjust the length of said groove of said die former, whereby the length of the louvers formed is adjusted.

31. A louver-forming tool as claimed in claim 26 wherein said track of said upper leg of said frame is flexible and constructed as a composite of layers and said mounting plate of said female die assembly is flexible and constructed as a composite of layers.

32. A louver-forming tool as claimed in claim 31 further comprising means for imparting flexure to said flexible track and to said flexible mounting plate.

33. A louver-forming tool as claimed in claim 26 wherein said means for defining the length of travel of said carriage includes a pin-in-hole index system.

34. A louver-forming tool as claimed in claim 26 wherein said means for defining the length of travel of said carriage includes a slide provided longitudinally on said frame and a pair of locking stops adapted to be moved to a multiplicity of fixed positions along said slide.

35. A louver-forming tool as claimed in claim 26 further including a guidance system locating the louvers to be formed in the work piece.

* * * * *